US008341735B2

(12) United States Patent
Larson et al.

(10) Patent No.: US 8,341,735 B2
(45) Date of Patent: Dec. 25, 2012

(54) METHOD AND ARRANGEMENT FOR AUTOMATICALLY CONTROLLING ACCESS BETWEEN A COMPUTER AND A COMMUNICATION NETWORK

(75) Inventors: Gunnar Larson, Taby (SE); Peter Fuks, Jarfalla (SE); Jorgen Appelgren, Taby (SE)

(73) Assignee: AB Snalle, Taby (SE)

( * ) Notice: Subject to any disclaimer, the term of this patent is extended or adjusted under 35 U.S.C. 154(b) by 1463 days.

(21) Appl. No.: 10/512,342

(22) PCT Filed: Apr. 16, 2003

(86) PCT No.: PCT/SE03/00628
§ 371 (c)(1),
(2), (4) Date: Jan. 9, 2005

(87) PCT Pub. No.: WO03/090047
PCT Pub. Date: Oct. 30, 2003

(65) Prior Publication Data
US 2006/0117384 A1    Jun. 1, 2006

(30) Foreign Application Priority Data
Apr. 22, 2002 (SE) .................................. 0201248

(51) Int. Cl.
*G06F 17/00* (2006.01)

(52) U.S. Cl. ................ 726/22; 726/11; 726/12; 726/23

(58) Field of Classification Search ............ 726/22, 726/11, 12, 23
See application file for complete search history.

(56) References Cited

U.S. PATENT DOCUMENTS

| 5,953,425 | A  | * | 9/1999  | Selker ........................... 713/185 |
| 5,987,611 | A  | * | 11/1999 | Freund ............................. 726/4 |
| 6,076,164 | A  |   | 6/2000  | Tanaka et al. |
| 6,193,153 | B1 |   | 2/2001  | Lambert |
| 6,256,014 | B1 | * | 7/2001  | Thomas et al. ................ 345/163 |
| 6,378,009 | B1 | * | 4/2002  | Pinkston et al. ................ 710/62 |
| 6,388,658 | B1 | * | 5/2002  | Ahern et al. ................... 345/168 |
| 6,615,272 | B1 | * | 9/2003  | Ambrose ...................... 709/238 |

(Continued)

FOREIGN PATENT DOCUMENTS

JP            9-006710 A    1/1997

(Continued)

OTHER PUBLICATIONS

ZoneAlarm documentation compiled between Apr. 12, 2001 and Jun. 4, 2001. © 1999-2001 Zone Labs Inc. Full PDF available at http://www.cogeco.com/files/pdf/internetconn_userguides/za.pdf.*

(Continued)

*Primary Examiner* — Edward Zee
*Assistant Examiner* — Thomas Gyorfi
(74) *Attorney, Agent, or Firm* — Young & Thompson (57) ABSTRACT

The present invention relates to a device and method for increasing the security for a computer or server adapted for communication with a communication network, for example the Internet. The method for automatically controlling access between the computer and the communication network arranges the access to be dependent on user activity. The user activity is determined by monitoring signal activity between the computer and at least one input/output device adapted for communication with the computer, and the user activity being defined as detection of signal activity between the computer and the input/output device. Access to the communication network is only allowed if user activity is occurring or has occurred in a predetermined time period.

20 Claims, 5 Drawing Sheets

U.S. PATENT DOCUMENTS

| | | | |
|---|---|---|---|
| 6,681,250 B1 * | 1/2004 | Thomas et al. | 709/226 |
| 6,857,005 B2 * | 2/2005 | Kistler et al. | 709/203 |
| 6,874,086 B1 * | 3/2005 | Gu et al. | 713/168 |
| 7,003,612 B1 * | 2/2006 | Takizawa et al. | 710/300 |
| 7,036,144 B2 * | 4/2006 | Welcher et al. | 726/16 |

FOREIGN PATENT DOCUMENTS

| | | |
|---|---|---|
| JP | 9-046343 A | 2/1997 |
| JP | 2002-149435 A | 5/2002 |
| JP | 2002-232451 A | 8/2002 |
| WO | WO 99/47989 | 9/1999 |

OTHER PUBLICATIONS

Russel, Charles. "Power Management in Windows XP" Published Mar. 25, 2002 at microsoft.com. http://www.microsoft.com/windowsxp/using/setup/learnmore/russel_02march25.mspx?pf=true.*

"Prevost, the Ultimate Class!" Reference dated Mar. 2, 2001 as verified by the Internet Archive. http://web.archive.org/web/20010302115429/http://prevost-stuff.com/Computers.htm.*

Winograd, Steve. "ICS Installation [WinMe]" Reference dated Feb. 24, 2001 as verified by the Internet Archive. http://web.archive.org/web/20010224060654/www.practicallynetworked.com/sharing/ics/icsmeinstall.htm.*

"Virtual Network Computing" from the University of Cambridge Department of Engineering. Published Jun. 4, 2002 as verified by the Internet Archive. http://web.archive.org/web/20020604014538/www.uk.research.att.com/vnc/.*

"Virtual network Computing: VNC—How it Works" Published Aug. 2, 2002 as verified by the Internet Archive. http://web.archive.org/web/20020802210504/www.uk.research.att.com/vnc/howitworks.html.*

John Bass. "Remote Control Hardware Options" Published Mar. 27, 2000 at computerworld.com.au (5 pages) http://www.computerworld.com.au/article/print/93435/remote_control_hardware_options/.*

Hutsko, Joe. "Basics: Safe Online at Home: Keeping Out Uninvited Guests" Published Apr. 19, 2001 by the New York Times (2 pages) http://www.nytimes.com/2001/04/19/technology/basics-safe-online-at-home-keeping-out-uninvited-guests.html?pagewanted=print&src=pm.*

Biersdorfer, J.D. "Q&A Ways to Keep Out Broadband Hackers" Published Sep. 21, 2000 by the New York Times (1 page) http://www.nytimes.com/2000/09/21/technology/q-a-ways-to-keep-out-broadband-hackers.html?pagewanted=print&src=pm.*

O'Driscoll, Gerard. "The Essential Guide to Home Networking Technologies" © 2000 Prentice Hall Inc. (pp. 140-141).*

"Astaro Security Linux" © 2000 Astaro AG. http://web.archive.org/web/20010124062600/www.astaro.com/products/index.html.*

Nikkei Communications, Dec. 17, 2001, pp. 5-7, 154-157 and 205.

Network Magazine, Apr. 2002, pp. 31-32 and 52-55.

* cited by examiner

METHOD AND ARRANGEMENT FOR AUTOMATICALLY CONTROLLING ACCESS BETWEEN A COMPUTER AND A COMMUNICATION NETWORK

The present invention relates to an apparatus and method for increasing security in data communication systems, in particular, to impede intrusion from and unwanted access to a communication network from a computer or server.

BACKGROUND OF THE INVENTION

The modern use of computers and communication networks has seen an increasing demand for having almost all computers, both in domestic use and in office use, connected to a network at all times, especially to Internet. The advantages of being "always" connected are many, for example fast access to the information available on Internet, the ability to receive and send e-mails without noticeable delays and notification of other incoming messages such as fax transmissions, Internet calls etc. However, the massive flow of information in combination with most computers having network connections has increased the vulnerability of the communication networks and the individual computers. Examples of the vulnerability of the systems include the devastating effects of computer viruses of various kinds, intrusion by "hackers" into corporations and governments computer systems, fraudulent use of credit cards/bank accounts by monitoring money transfer via Internet and unauthorized access to crucial business information. Another type of misuse of the computer networks that recently has arisen is, without knowledge of the owner, to use a company's server or someone's domestic computer for storing and distributing files. This is typically done by intruders for the purpose of not having to provide the storage capacity themselves and/or to store and distribute material of dubious or illegal character, such as unauthorized copies of music or movies. A specially dangerous and deceptive type of virus is the so called Trojan horses and worms. This types of virus typically enters the computer in an e-mail or a file fetched from the Internet. In the computer the virus program can for example send files and/or information such as passwords to an Internet address. An intruder may then use the information send by the Trojan horse to access the computer and since the virus has provided the intruder with all relevant information this intrusion will appear like an authorized access to the computer.

Today attempts to intrude a computer or server often include the use of a number of viruses as well as other methods of gaining access to, and even control over, the target. Such a destructive program package may include one virus shutting down antivirus and virus warning software, one program looking for ways of getting access to the computer and yet another program searching for passwords, usernames and addresses.

Many computers today are provided with cameras, microphones or other communication devices, typically for the purpose of being able to communicate with voice and picture over the Internet. If an intruder gets control over such equipped computer, for example by use of a Trojan virus, it will be fairly easy for the intruder to use for example the computers microphone for overhearing and recording a conversation taking place in the room where the computer is situated. This can obviously be used for espionage and other forms of criminal activities.

The predominant way of addressing security issues in today's communication networks is by the use of "firewalls". Firewalls often combine use of proxy servers and filtering techniques such as stateful inspection filter to reduce the possibilities for unwanted access and attacks of viruses. For a comprehensive description of common current security measures see for example "Datakonmmunikation i praktiken", chapter 20, Kent Mayer, Pagina.se 2001. Although, in many ways effective, the Firewalls need to be continuously updated and maintained by skilled personnel in order to maintain an acceptable level of protection. This is time-consuming and costly, both in man-hours and in upgrading equipment. For smaller businesses, and for persons wanting to have their home computers connected to a network, the installation of firewalls, and in particular the maintenance of them, can be too costly or too complicated, to be considered economically justifiable.

Another area of security is within internal networks, often so called intranets. An organisation's intranet may be protect from outside attacks by firewalls. However, information, which is not meant to be seen by everyone, is often created and shared within the organisation. It is often fairly easy to, within an intranet, look into or copy the work of others.

Thus, although the introduction and widespread use of Firewalls, and the associated proxy servers and techniques for filtering, has greatly increased the level of security in communication networks, there is a need for solutions further improving the security. Not at least for small entities and home users, not having the economical means or technical competence needed for installing and maintaining a security system based on Firewalls.

SUMMARY OF THE INVENTION

One object of the present invention is to provide method and device for improving the security of computers and/or servers which are connected to a communication network that overcomes the drawbacks of the prior art.

A further object of the present invention is to reduce the risk of that the computer and to it connected input/output devices is used for spying.

An important observation, which should be considered as part of the invention, made by the inventors, is that the length of a time-period during which a computer or server is connected to a network is highly related to their vulnerability for intrusions. By being always connected a computer can be subjected to hackers attempts continuously, and as the breaking of passwords, codes and encryption often is a time-consuming process an unlimited access to the target computer or computer system is often a prerequisite for the "success" of the intruder. By reducing the time-periods of network connection the possibility for an intruder to gain access to and control over a computer is significantly reduced. Also the search for entities to attack is a time-consuming procedure, and by not being connected at all times, i.e. not being "seen" on the communication network at all times reduces the possibility of being pinpointed as an interesting entity to intrude.

It is not sufficent to stop the attacks from the outside. Attacks from the inside, for example made by viruses of Trojan or worm type, must also be stopped. The risk of a virus of this type sending out information is significantly reduced if the time the computer is connected to the data communication network is reduced. As discussed above an intrusion often involves a number of methods and viruses of different type. In the following, viruses of Trojan or worm type are used as examples since they are well known and documented viruses. These are to be regarded as exemplary and the use of the present invention is not limited to these.

Therefore, it is the aim of the invention to minimize the time a computer or a server is connected to a network in a manner that does not introduce any significant inconvenience for the user or that does not impede the performance of the computer and its applications.

The above described is crucial if no other measures of security has been taken, for example in a typical domestic use of a computer. But also in systems which utilize means for security such as firewalls the principle of reducing the time connected to the network will limit the possibilities for attempts by hackers and therefore increase the security.

In addition, the previously described unacknowledged use of a network computer or a server for storing and/or distributing files is effectively prevented if the computer/server is not connected for extended periods. That computer/server will simply not be an interesting target for the potential intruder.

In the method and device according to the invention the access between a computer and a communication network is arranged to be dependent on user activity. In particular user activity is defined as signal activity between the computer and at least one input/output device.

According to another aspect of the invention the input/output devices are categorized as main input/output devices and secondary input/output devices. The connection to the secondary input/output device is arranged to be dependent on user activity.

One advantage afforded by the present invention is that the time period in which the computer is accessed to the communication network significantly reduced.

Another advantage afforded by the invention is that net access controller prohibits access to the network if an unwanted network access has previously been attempted.

Yet another advantage is that a user is provided with the possibility to close the access to the communication network.

A further advantage is that secondary input/output devices can be temporarily disconnected.

BRIEF DESCRIPTION OF THE DRAWINGS

The invention will now be described in detail with reference to the drawing figures, in which.

DETAILED DESCRIPTION OF THE INVENTION

Figure 1A:
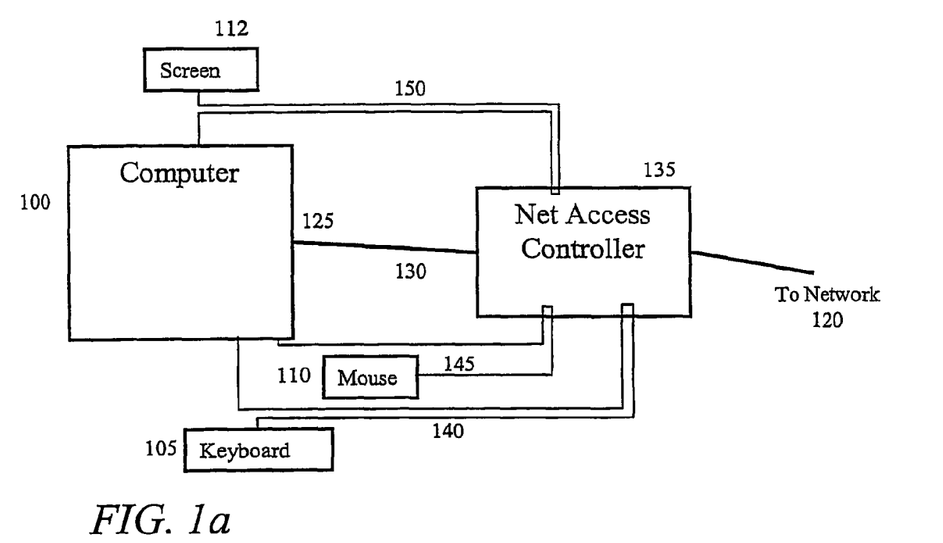
FIG. 1a is a schematic drawing illustrating the use of the net access controller according to the present invention.

In a first embodiment of the present invention, described with reference to FIG. 1a, a device according to the invention, hereafter referred to as the net access controller controls the access to and from a communication network to and from a computer. The computer 100 is connected to a variety of input/output devices such as a keyboard 105, a mouse 110 and a screen 112. As appreciated by the skilled in the art a large number of different type of input/output devices are possible, including cameras, microphones, joysticks, digitizers, printers, scanners and loudspeakers, and the above mentioned should be considered as examples commonly used in many applications. The computer 100 is connected to a communication network 120, typically through a standardized interface 125 and a cable 130. The network connection is done via a net access controller 135, according to the invention. The net access controller 135 is in addition connected to a one or more of the input/output devices such as the keyboard 105, mouse 110 and screen 112 through cables 140, 145 and 150 respectively. The connections between the different units have here been illustrated with cables. As apparent to the skilled in the art other types of communication means such as short distance radio, e.g. Bluetooth™ and IR could advantageously be used for interconnecting the units. The network connection, as well as the type of network can be of many different types, including Local Area Network (LAN), Wireless Local Area Network (W-LAN), modem- or ISDN-connection, Asymmetric Digital Subscriber Line (ADSL) or any kind of broadband.

A main functional part of the net access controller is a switch which interrupts the physical connection of the computer to the communication network 120. The switch is operated by a system functionally separated from the communication network. The switching functionality of the net access controller ensures that the computer will be impossible to access without permission from the user, as well as it will be impossible for the computer to access the communication network 120 without permission from the user. The principle functionality as well as different embodiments will be described below.

Figure 1B:
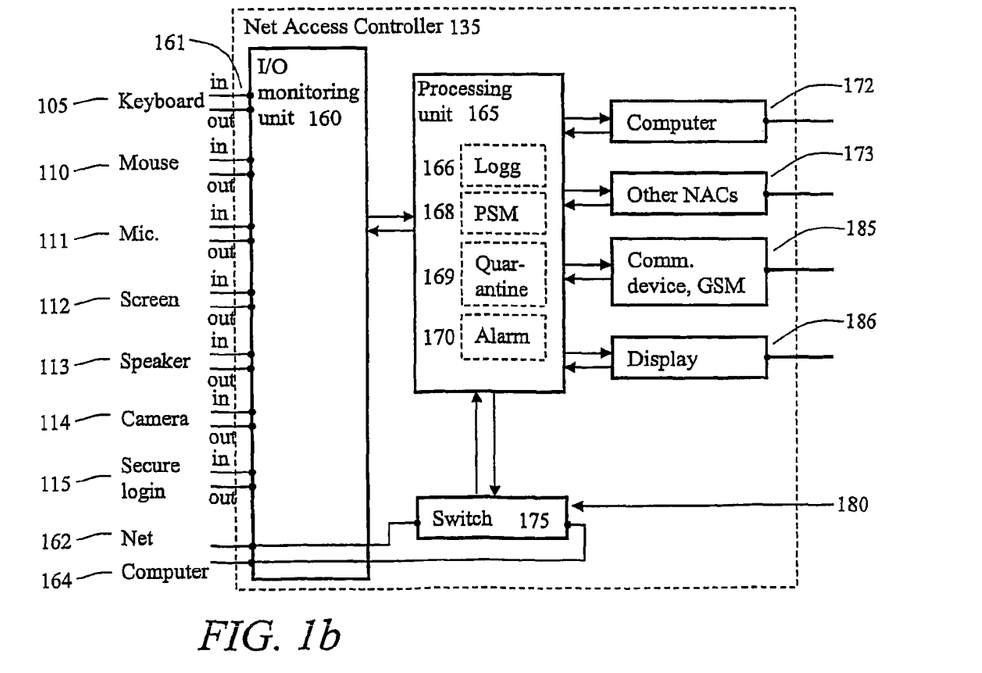
FIG. 1b is a block diagram illustrating the net access controller according to an embodiment of the present invention.

The net access controller 135 with the above indicated features can be realized in various ways, one exemplary realisation will be described with reference to FIG 1b. The net access controller 135 comprises an I/O signal monitoring unit 160, which provide connectors 161 and suitable interfaces for the Input/Output devices such as the keyboard 105, mouse 110, microphone 111, screen 112, Speaker 113, Camera 114 and Secure Login devices 115, as well as a network in-connection 162, a network out-connection 164. The I/O signal monitoring unit 160 analyses signalling activity from the I/O devices and the network connections, and is connected to a processing module 165. The processing module 165 is typically a software programmable integrated circuit and may comprise a logging function 166, a private security mode (PSM) function 168 and a quarantine function 169. The processing module 165 controls a switch 175, which in turns control the access to the network by opening and closing of the circuit between the network in-connection 162 and the network out-connection 164. The switch 175 may in addition be controlled by controlling means 180, for example a button on the outside surface of the Net Access controller, for manually switching the switch 175 on and off. In certain embodiments the net access controller is provided with a computer interface 172 for communication with the computer 100 and a communication interface 173 for communication with other net access controllers. The net access controller may additionally be provided with a communication module 185, which is capable of communicating with a communication system other than the data communication network which the computer 100 is connected to. The communication device may for example be a GSM unit for data communication over the air interface. The Net Access controller may further be provided with displaying and indication means for example an LCD and LEDs 186.

In the above description the switch 175 is typically a switch transistor or a relay. As appreciated by the skilled in the art the switching functionality may be achieved in a number of ways. In certain applications, for example if radio or fiber optics is used for the network connection it may be more technical feasibly to, instead of switching off the network with a relay, to open the connection to the power supply to the UARTs or to the transceiver circuits. The switch and the switching functionality should be regarded as ways of securely turn off the possibility of establishing and maintaining communication between the computer 100 and the communication network 120.

Methods and means for detecting signalling activity from I/O devices such as a mouse is known in the art, and is commonly used for screen savers, to save energy and to prolong usage time in for example battery operated laptop computers. Usage and detection means are described in for example U.S. Pat. Nos. 6,000,003 and 5,481,732. In the present application the signal activity is typically detected as the existence of a physical signal in for example the cable connecting an I/O unit to the computer. Such signals are often hard, or even impossible, to generate by for example a "hacker" trying to take control of the computer via the internet connection. Hence, to determine user activity on the physical signalling between I/O units, especially "dumb" I/O units such as a mouse, and the computer could offer a high security than relaying on higher level information originating from program functions within the computer, as the latter could more easily be generated by an intruder or a virus.

As appreciated by the skilled in the art the net access controller can be realised in many ways. The signal detection part can be made with analogue circuits and the processing module with use of digital logic. Alternatively most of the net access controller can be made almost entirely with software controlled circuits, utilizing for example digital filters in the signalling detection part.

Figure 2:
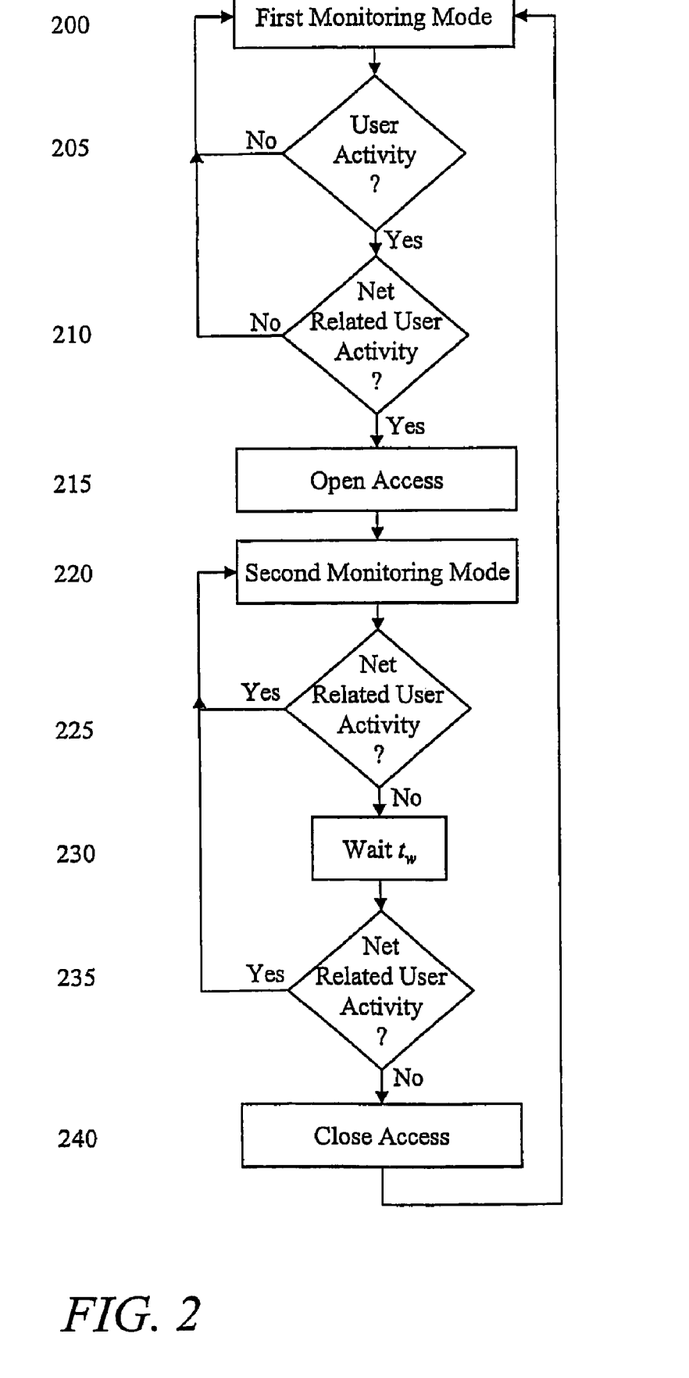
FIG. 2 is a flowchart illustrating one embodiment of the present invention.

Described with reference to the flowchart of FIG. 2 is the principle operation of a first embodiment of the net access controller according to the invention. In the following algorithms "user activity" is defined as any signalling activity from the I/O units corresponding to a user actively using the computer. It should be understood that the signal activity could be the very existence of a carrier wave or a relevant electrical signal between an I/O unit and the computer. The information content does, typically and preferably, not need to be revealed and analyzed. It is the signal itself in its physical existence that is of primary interest. However, in certain application it may be useful to also analyze the information content in the signalling between an I/O unit and the computer, and the following algorithms are easily adapted to such applications. "Net related user activity" is defined as from the computer outgoing signalling to the communication network 120 and is indicative of an activity initiated by the user e.g. checking of incoming e-mails. "Net activity" is defined as signalling from the computer to the network which does not relate to a user activity i.e. in most cases an unwanted network activity. The same definitions are used for all embodiments.

200: In a first step 200 the net access controller is in a first monitoring mode. The access to the communication network 120 is closed i.e. no communication can be made to or from the computer 100. In the first monitoring mode the net access controller will continuously check the user activity and the net related user activity according to the above definition, as described in step 205-210.

205: The net access controller will in step 205 check the user activity. If no user activity it goes back to step 200. If user activity is detected i.e. signalling activity to and/or from the input/output devices 105, 110 and 115 it proceeds to step 210.

210: In step 210 the net access controller check for net related user activity. If no such activity is detected there is no indication of the user wanting access to the communication network 120 and the switch 175 keeps the access to the communication network closed. If net related user activity is detected the algorithm proceeds to step 215.

215: In step 215 the Net access Controller opens the access to the communication network, allowing access for example to the Internet. It should be stressed that two criteria have to be fulfilled for the net access controller to open the access: user activity and net related user activity.

220: After opening of the access, the Net Access Control enters, in step 220, a second monitoring mode characterized by continuously monitoring of the net related user activity.

225: In step 225 the net access controller check for net related user activity. If net related user activity is detected, which is indicative of the user still actively uses computer applications needing network communication, the algorithm goes back to step 220. If no such activity is detected the algorithm proceeds to step 230.

230: Step 230 consists of waiting a predefined period of time, $t_w$. The purpose of the waiting time is to not let the short periods without signalling that typically appears in all communication, cause a closing of the network access.

235: In step 235 the net related user activity is again checked. If net related user activity is detected, this is an indication of that the result (no activity) of step 225 was due to short break in the communication and not an indication of the termination of the computer application requiring network communication. In this case the net access controller will stay in the second monitoring mode i.e. go to step 220. If no net related user activity is detected the algorithm proceeds to step 240.

240: In step 240 the net access controller closes the access to the communication network, not allowing any communication to or from the communication network 120. The net access controller goes back to the first monitoring mode, i.e. go to 200.

The above described "continuously monitoring", utilized in both the first and the second monitoring modes, must not be strictly continuous. The monitoring will be typically performed at regular time intervals, the intervals chosen so that for all applications executed on the computer the monitoring is, by the user, perceived as being continuous.

The predefined period of time, $t_w$, which the net access controller waits before switching the network connection off, is a parameter that typically is set by the user. A method of entering the time-period, $t_w$, as well as other user specific parameters will be described in a further embodiment of the invention. The purpose of introducing the waiting time and the procedure according to step 225-235 is to not let the short periods without signalling that typically appears in all communication, cause a closing of the network access. As appreciated by the skilled in the art this could be implemented in various ways. For example having a fixed wait time and requiring a number (possible set by the user) of consecutive detections of net related user activity.

Parameters representing a typical usage of the net access controller are preferably set by the manufacturer. The user may want to, on installation or during maintenance, change some of the parameters. In one embodiment of the invention the net access controller 135 is provided with the computer interface 172 and means for communicating with the computer. This could be with any of the communication ports and protocols which a computer typically is equipped with such as the serial RS-232, parallel ports or USB. User specific parameters and settings such as the timeperiod, $t_w$, are entered to the computer 100 and transmitted to the net access controller via the computer interface 172 and with the aid of a software program executed on the computer and in the processing module 165 of the net access controller. Of importance for maintaining the increased security provided by the net access controller the communication between the net access controller and the computer should be performed in a manner that is not possible to control remotely by an intruder. Preferably, the communication should not be done via the network connection cables or the with the protocols typically used in the computer networks. Typically the connection is used only for limited time intervals during a set-up procedure or during transfer of log information (se below). Information is when shared between the computer and the net access controller and preferably immediately after the information transfer the connection to the computer is securely terminated, for example with a switch electrically separating the units. Alternatively, as appreciated by the skilled in the art, other means of setting parameters in the net access controller could be utilized, the net access controller could for example be provided with a simple I/O device.

In one embodiment of the invention the net access controller 135 is provided with a logging function 166, capable of detecting the signalling activity to and from the network connection 120 and storing a log of attempts from the computer to access the communication network and possible also contacting attempts from the communication network to the computer. Any attempts from the computer 100 to access the communication network 120, when such attempts are not to be expected, i.e. the case of no user activity in the first monitoring mode may be stored in the log. Such attempts could be an indication of a virus of Trojan-type residing in the computer and trying to make contact to the internet. The log of contacting attempts may be presented to the user on a display on the net access controller. Alternatively the log is transmitted from the net access controller to the computer through the communication interface 172, possibly for further processing with suitable software in the computer 100. Likewise may the net access controller be used to log contacting attempts from the communication network 120 to the computer 100. The communication between the net access controller and the computer should preferably be strictly one-directional, preventing any changing in the settings of the net access controller, but allowing the logging and alarming information to be transferred to the computer.

Alternatively, if the computer is in active use, but no net related user activity is taking places (first monitoring mode), the user can be alarmed by the net access controller, via the communication interface 172, or via an audiovisual alarm-signal, of a contacting attempt. The user may then either approve the attempt or disapprove it.

In the above described embodiments the switching off of the network has primarily been done by the net access controller 135 automatically based on user activity and net related user activity. In addition the net access controller 135 can be used to quickly disconnect from the communication network 120, either by order the switching off from the computer 100 or from some means of remote control. Alternatively the net access controller can be provided with a button, which when manually pressed by the user immediately switches the network connection off. The net access controller will now be in a secure mode, referred to as "private security mode" (PSM). The private security mode can be reset, i.e. allow access to the communication network, by again pressing the button, from the computer 100 or via the means of remote control. The use of this feature would for example be in the above described scenario of the net access controller detecting and sending an alarm on signalling activity indicative of unwanted intrusion. Another use may be within an intranet i.e. an office internal communication network. Within such network the security is often low, as one of the main purposes of the intranet is to share information in a convenient way. Although, the openness of the intranets in many cases is a wanted feature, occasionally a member of the intranet handles information that is not intended for everyone. By the use of the private secure mode of the net access controller the member may switch off the intranet access, for example while working on a document containing sensitive information. After storing the document in a way which is not accessible from the intranet, for example on a removable hard disk or a cd, the access to the intranet is switched on again, i.e. the private security mode is reseted.

As an alternative or complement to an alarm signal, calling for action from a user, the net access controller 135 may on the detection of an unexpected attempt of access to the communication network 120 switch off the network access automatically. This will put the net access controller in a "quarantine mode" (QM) not allowing any network access before the quarantine mode has been reset by an action of the user, for example pressing a button on the net access controller.

The above embodiments of the net access controller 135 can be incorporated with only slight changes to the algorithm described with references to the flowchart of FIG. 2. These changes will be described with references to FIG. 3. The algorithm has been provided with two additional steps, 202 (placed between steps 200 and 205) and 220 (placed between steps 222 and 225).

Figure 3:
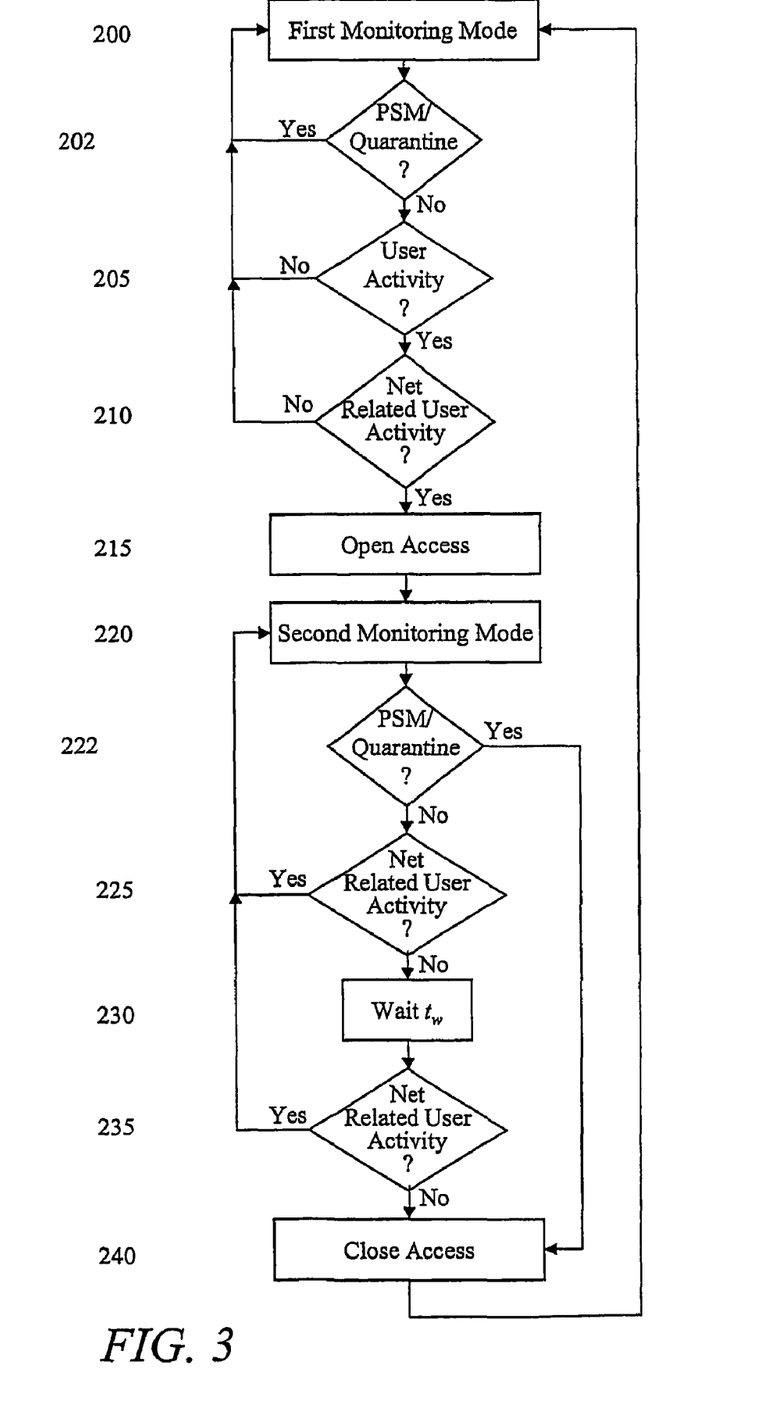
FIG. 3 is a flowchart illustrating one embodiment of the present invention.

202: In step 202 the algorithm controls if the private security mode (PSM) or the quarantine mode (QM) has been activated by the user, or automatically by the net access controller, respectively. If either of the modes are active the net access controller will remain in the First Monitoring mode, i.e. not open the access the network, until the PSM or the QM is reset by the user.

222: In step 222 the algorithm again controls if the private security mode (PSM) or the quarantine mode (QM) has been activated by the user, or automatically by the net access controller, respectively. If either of the modes are active the net access controller will immediately close the Access to the network, i.e. goes to step the First Monitoring mode, i.e. not open the access the network, until the PSM or the QM is reset by the user.

Figure 4:
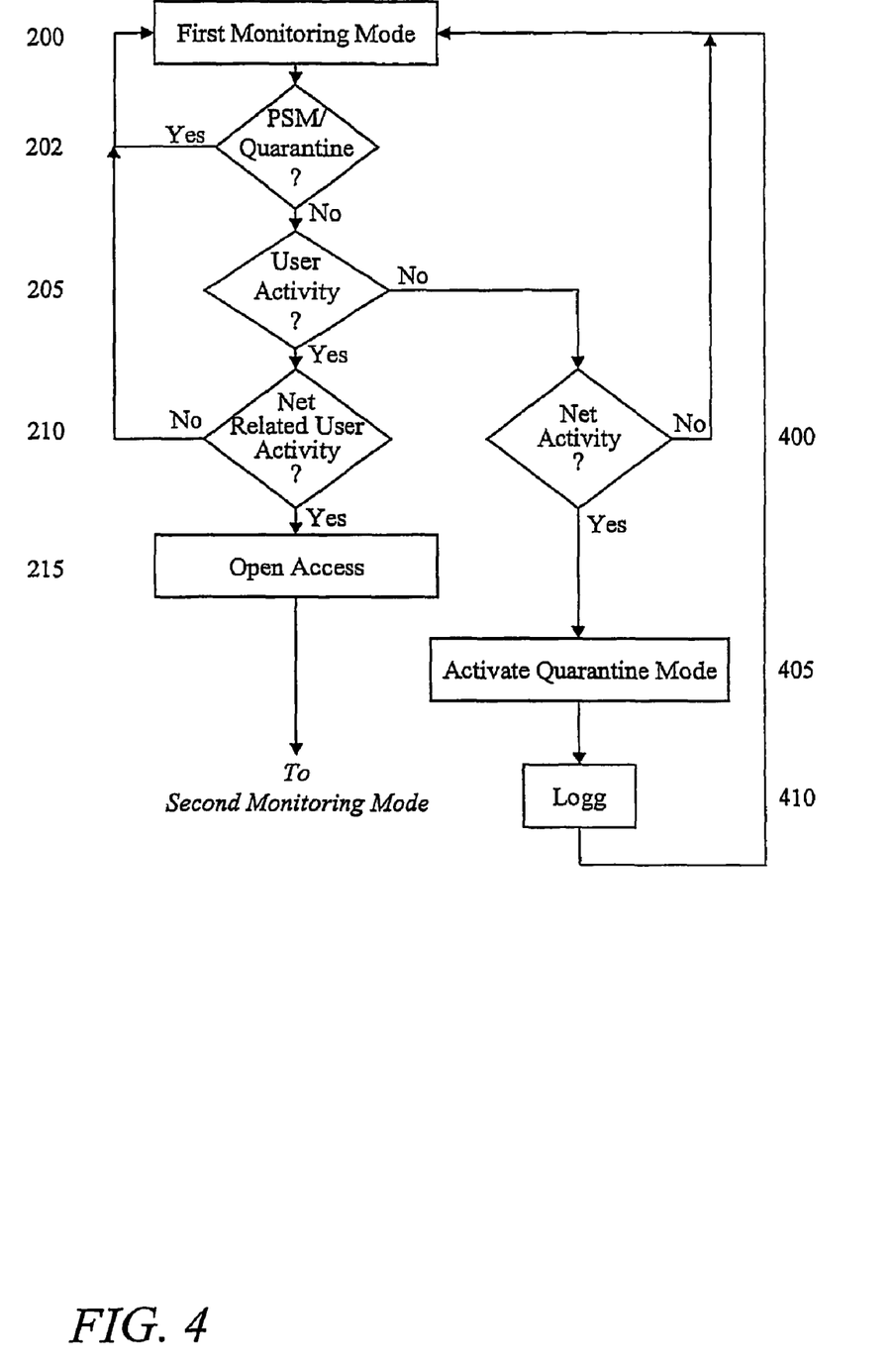
FIG. 4 is a flowchart illustrating one embodiment of the present invention.

The quarantine mode (QM), automatically activated by the net access controller offers increased security and possibility to track and take actions against for example viruses of Trojan type. A method of using the QM will be described with references to the flowcharts of FIGS. 2, 3 and 4. If in step 205 no user activity has been detected the algorithm performs a check if the computer tries to initiate net activity according to the following steps:

400: In step 400 the net access controller check for attempted net activity, by monitoring the from the computer 100 outgoing signals. If no attempted net activity is detected the algorithm goes back to its first monitoring mode 200. If the net access controller detects signalling attempts from the computer to the network the algorithm proceeds to step 405.

405: In step 405 the quarantine mode (QM) is activated. The quarantine mode (QM) can only be reset by an action by the user.

410: In an optional step 410, the attempt to access the communication network is stored in a log, which as above described may be presented to the user in a number of ways. After step 410 (or 405) the net access controller returns to its first monitoring mode 200.

It should be noted that during the above routines the access to the network has never been opened. The quarantine mode (QM) assures that the user has a possibility of taking appropriate actions, for example running a program that detects and removes viruses or spy software, before the access to the network is reopened.

Alternatively the QM could be activated by unexpected signalling from for example an I/O device such as a camera or a microphone. Such signalling can be an indication of someone trying to use the computer for spying. The I/O devices are in this embodiment divided in main devices such as mouse, screen and keyboard and secondary I/O devices such as microphone or a camera. How the I/O devices are categorized is typically dependent on commonly used applications and set by the user. User activity is now defined only from the main I/O devices, i.e. step 205 comprises of monitoring signalling activity to/from the main I/O devices. Step 400 will now also comprises monitoring signalling activity from the secondary I/O devices and if net activity and/or signalling activity from secondary I/O devices is detected the QM is activated. This use of the QM mode can be given the general description that certain predefined combinations of signalling activity/lack of activity should result in activation of quarantine mode (QM).

In a further embodiment of the invention the security is further increased by letting the net access controller not only monitors but also can disconnect selected I/O devices. The net access controller 135 is further provided with switching means connected to some or all of the I/O connectors 161. After predefined time period, $t_z$, in the first monitoring mode, without any user activity, the net access controller disconnect pre-selected I/O devices. Preferably all I/O devices are disconnected except secure login devices for example fingerprint verification scanner, eye scanner, transponder, smartcard readers, keys etc. In this mode, the I/O security mode (I/O-mode), the net access controller is used not only for blocking unwanted access to/from the communication network, but also to increase the security if someone, on location, tries to gain access to the computer via the I/O devices. In the I/O-mode, the only way to get access to the computer is via the I/O device, preferably a secure login device, specified in the net access controller. After an authorized access the net access controller returns to the first monitoring mode and hence allows communication between the computer and the I/O devices. The user may have specified that in this step not all I/O devices are connected, only I/O devices considered to be essential are connected. The net access controller may in addition be equipped with an alarm function issuing an audio-visual alarm and/or an alarm via the communication module 185. The alarm function is arranged to be activated if for example any I/O cables are removed from the net access controller—this being an indication of an intruder trying to bypass the I/O-mode. The alarm may additionally be used to protect from theft of the computer, parts of the computer or the net access controller.

Figure 5:
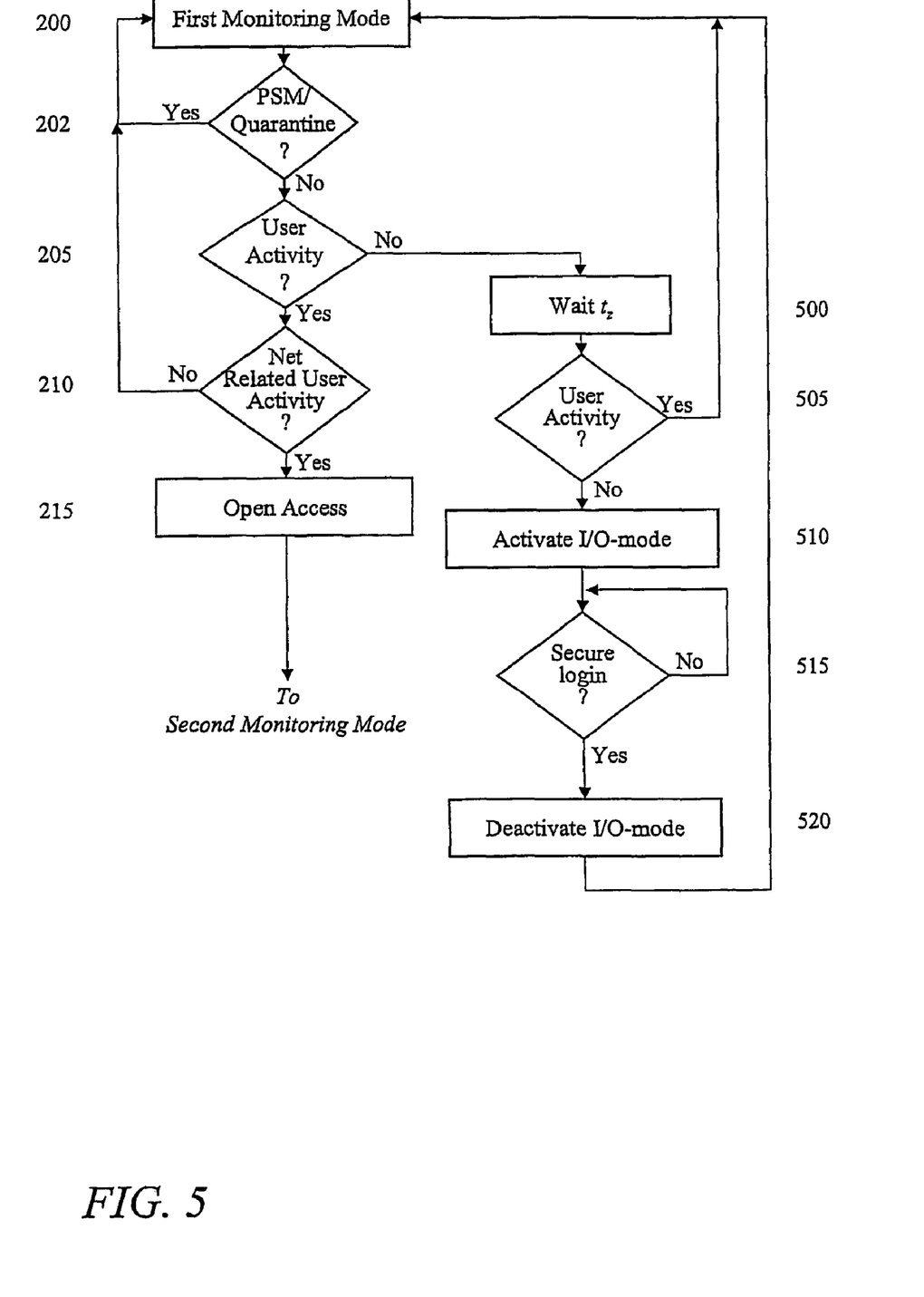
FIG. 5 is a flowchart illustrating one embodiment of the present invention.

A method of using the I/O-mode will be described with references to the flowcharts of FIGS. 2, 3 and 5. If in step 205 no user activity has been detected the algorithm comprises the following steps:

500: In step 500 waiting a predefined time $t_z$.

505: In step 505 the check for user activity is repeated. If user activity is occurring go to step 200, if not:

510: In step 510 the I/O-mode is activated i.e. the connections to pre-selected I/O devices are closed. Preferably all I/O devices except the secure login device are disconnected.

515: During the I/O-mode the net access controller monitors one or more connections to selected secure login devices. If no access attempts are detected or an access attempt failing to correctly authorize the algorithm remains in the I/O-mode. If in an authorized access is detected the algorithm proceeds to step 520.

520: In step 520 the I/O-mode is deactivated and the algorithm returns to the first monitoring mode (200).

The possibility provided by invention to block the communication between selected I/O devices and the computer can be used to customize the computer and the I/O devices to different applications and situation. In this embodiment the user specifies to the net access controller certain I/O devices to be in active use, all other I/O is then disconnected by the net access controller. The function is activated either on the net access controller, remotely via the communication device 185, or from the computer. The user may for example chose to have the keyboard, screen and mouse connected, but disconnects the microphone. This function can be used with all of the above described modes and reduces the risk of I/O devices such as microphones and cameras are used for spying.

The use of the net access controller 135 has here been illustrated in connection with a single computer. The net access controller could also advantageously be utilized in a client-server network. A number of, or all, of the client computers can be provided with net access controllers according to the invention. The plurality of net access controllers are in communication with each other or a central communication unit and the system may for example be used to turn off the server, or the server's outside network connection if no net related user activity is detected by the net access controllers. The system may also be used for rapidly disconnecting a number of computers from the internet if a warning of a virus attack is received.

In a further embodiment of the invention the switch controlling the access to the communication of the net access controller 135, is provided with means for remote control of the switch 175. To keep the security at a high level the remote controlling means should not be accessible through the common data communication networks such as Intranet. The remote controlling could for example be made through a telephony system such as GSM. The net access controller 135 is provided, as illustrated in FIG 1b, with a communication module 185, which has the functionality of a GSM-phone. The module is provided with a subscriber number and the capabilities of decoding and processing data transmitted in an SMS (Short Messaging Service) MMS (Multimedia Messaging Service) or via OTA (Over The Air message) or by use of the GPRS-standard. The use of the communication device is manifold: a) the log of the logging function is transmitted by the communication device to a system responsible, b) parameters setting up the net access controller is transmitted and entered to one or more net access controllers in a secure and convenient manner, c) in case of a virus-warning a message is remotely sent to the communication module which initiate that the network connection is switched off, d) a command switching off all computers network access can be rapidly transmitted with a group SMS or a broadcast message, e) allowing secure access to a company's internal network for authorized outside user, for example an employer wanting to work from home and accessing the company's network.

In the latter case the access to the communication network is switched off. If an authorized user wants to access the server or computer through the communication network, the user first switches the network connection on through the communication module 185. This procedure may involve the following steps:

a. Calling the communication module 185 (GSM module) by a normal calling procedure and with the use of DTMF give a PIN-code and a code corresponding to changing the switch to "on". Alternatively an SMS including a PIN-code and a code representing "on" can be transmitted to the GSM module or any other presently available or future means for packet data transmission can be used.

b. The code representing the "on" position of the network switch is interpreted by the net access controller 135 and the switch changed to allow connection to the network.

c. The authorized user can now access the server/computer, preferably with typical security measures including specifying user name and password.

d. After the session is over the authorized user can, similar to in step a), through the GSM module, order the net access controller to switch the network connection off. Alternatively, or as a further security measure, the net access controller 135 can switch the network connection off after a predefined period of time with no signal activity in the network connection.

As appreciated by the skilled in the art, most existing and future telecommunication systems including TDMAThe use of the net access controller according to the invention will significantly increase the security. The invention may also advantageously be utilized in combination with known security methods and products such as antivirus software, firewalls and encryption. The usefulness of the invention can be illustrated with the combined use of encryption. Today's advanced encryption techniques provide an acceptably safe transfer of a message or document via the Internet. However, at some point the message or document has to be decrypted by the receiver. During the decryption and while the document is in a non encrypted format, the user can activate the private security mode of the net access controller to make sure that no access to the communication network is possible. Hence, not only the transfer but also the weaving and processing of a message can be performed with high security.

A future use of the net access controller is in the area of IP-telephony. The signal detection and alarm possibilities of the net access controller may advantageously be utilized to notify a user of an incoming IP-telephony call and to open the connections necessary for receiving the call, including the access to the communication network and connections to appropriate I/O devices such as microphone, speakers and camera.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The invention claimed is:

1. A method for automatically controlling access between a computer and a communication network, which method comprises the steps of:

monitoring user activity by monitoring physical signal existence from at least one input/output device adapted for communication with the computer, and wherein a detection of physical signal existence from the input/output device is an indication of user activity;

monitoring net related user activity by monitoring signal activity from the computer, and wherein a detection of physical signal existence from the computer is an indication of net related user activity;

automatically allowing access from at least one of the computer to the communication network and access from the communication network to the computer, upon first detecting user activity and subsequently detecting net related user activity;

a first monitoring mode prohibiting access between the computer and the communication network, the first monitoring mode comprises step of:

monitoring user activity;

monitoring, upon user activity having been detected, net related user activity; and changing, upon both user activity and net related user activity having been detected, from the first monitoring mode to a second monitoring mode;

a second monitoring mode, allowing access between the computer and the communication network, the second monitoring mode comprises step of:

monitoring net related user activity, and upon net related user activity being free of detection in a predefined period of time (tw), changing to the first monitoring mode not allowing access between the computer and the communication network, wherein the method is performed by a processing unit within a communication network access controller that is adapted for connection between an interface and the communication network through which interface the computer is connected to said communication network, the communication network access controller is further connected to one or more input/output devices, and which controller being in the first monitoring mode is adapted for interrupting the communication between the computer and the communication network by interrupting the physical connection of the computer to the communication network.

2. The method according to claim 1, wherein the changing of modes is initiated manually.

3. The method according to claim 1, wherein the input/output devices includes at least one of the devices: keyboard, screen, mouse, camera, microphone, joystick, scanner or secure login devices.

4. The method according to claim 1, wherein the input/output devices comprises at least one input/output device defined as main input/output device and at least one input/output device defined as secondary input/output device, and user activity is defined as signal activity from the at least one main input/output device.

5. The method according to claim 1, wherein the method further comprises a private security mode (PSM) which is activated and deactivated by the user, an activated PSM implying that access between the computer and the communication network is not allowable and a deactivated PSM implying that access between the computer and the communication network is allowable, the method comprising the further steps, to be taken in the first monitoring mode, of:

determining upon the PSM being activated; and upon both user activity and net related user activity being detected and upon PSM being free of activation allowing access between the computer and the communication network, and the method comprising the further steps, to be taken in the second monitoring mode, of:

determining PSM activation; and upon PSM being activated, changing to the first monitoring mode not allowing access between the computer and the communication network.

6. The method according to claim 1, wherein the method further comprises a quarantine mode (QM) which is activated automatically, an activated QM implying that access between the computer and the communication network is not allowable, the method comprising the further steps, to be taken in the first monitoring mode, of:

determining QM activation; and upon both user activity and net related user activity being detected and upon QM being free of activation, allowing access between the computer and the communication network, and the method comprising the further steps, to be taken in the second monitoring mode, of:

determining QM activation; and upon QM being activated changing to the first monitoring mode not allowing access between the computer and the communication network.

7. The method according to claim 1, wherein the method further comprises a quarantine mode (QM) which is activated automatically, an activated QM implying that access between the computer and the communication network is not allowable and/or a private security mode (PSM) which is activated and deactivated by the user, an activated PSM implying that access between the computer and the communication network is not allowable and a deactivated PSM implying that access between the computer and the communication network is allowable, the method comprising the further steps, to be taken in the first monitoring mode of:

determining at least one of the PSM and the QM being activated;

monitoring user activity, and upon no user activity being detected and upon PSM or QM being free of activation, monitoring net activity, and upon net activity being detected, performing the steps of:

activating the QM; and logging the detected net activity.

8. The method of claim 1, wherein the detection of signal activity between the computer and the input/output device is unrelated to input to any particular program.

9. A communication network access controller for increasing security of a computer connected to a communication network, the net access controller comprises:

means for detecting user activity arranged to be connected to at least one input/output device and arranged to monitor physical signal existence from the input/output device to the computer;

means for detecting net related user activity arranged to be connected between the computer and the communication network and arranged to monitor physical signal existence between the computer and the communication network and the communication network;

means for controlling access between the computer and the communication network, which controlling access means is arranged to interact with user activity detecting means and the net related user activity detecting means, the access controlling means adapted to provide a first monitoring mode of the communication network access controller prohibiting access between the computer and the communication network, and a second monitoring mode of the network access controller allowing access between the computer and the communication network, and the access controlling means arranged to, in the first monitoring mode, upon the user activity detecting means first detects user activity and the net related user activity detecting means subsequently detects net related user activity, automatically set the communication network access controller into the second monitoring mode, and in the second monitoring mode 220, upon the net related user activity detecting means does not detecting any net related user activity in a predefined period of time ($t_w$) set the communication network access controller into the first monitoring mode;

connecting means to connect the net access controller to a connection between an interface through which the computer is communicating with said communication network and the communication network;

switch means controlled by said controlling access means to interrupt the communication between the computer and the communication network by interrupting the physical connection of the computer to the communication network.

10. The net access controller according to claim 9, wherein the network access controller further comprises means for activating the switch means a predetermined period of time after user activity was detected.

11. The net access controller according to claim 9, wherein the network access controller further comprises power reduction means connected to said control means and arranged to block the computer from the communication network.

12. The net access controller according to claim 11, wherein the network access controller further comprises means for activating the power reduction means a predetermined period of time after user activity was detected by the net access controller.

13. The net access controller according to claim 9, wherein the input/output devices comprises at least one of or the devices: keyboard, screen, mouse, camera, microphone, joystick, scanner, or secure login devices.

14. The net access controller according to claim 9, wherein the net access controller further comprises means for generating and storing a log of attempts to access the communication network from the computer.

15. The net access controller according to claim 9, wherein the net access controller further comprises means for generating and storing a log of attempts to access the computer from the communication network.

16. The net access controller according to claim 9, wherein the net access controller further comprises a communication module for communication via a second communication network different from said communication network.

17. The net access controller according to claim 16, wherein the second communication network is a wireless telephony system.

18. A system comprising a computer, at least one input/output device adapted for communication with the computer via a net access controller wherein said net access controller comprises:

means for detecting user activity arranged to be connected to at least one input/output device and arranged to monitor a signal existence between the computer and the input/output device;

means for detecting net related user activity arranged to be connected between the computer and the communication network and arranged to monitor signal existence between the computer and the communication network;

means for controlling access between the computer and the communication network, which controlling access means is arranged to interact with user activity detecting means and the net related user activity detecting means, the access controlling means adapted to provide a first monitoring mode of the communication network access controller prohibiting access between the computer and the communication network, and a second monitoring mode of the network access controller allowing access between the computer and the communication network, and the access controlling means arranged to, in the first monitoring mode, upon the user activity detecting means first detecting user activity and the net related user activity detecting means subsequently detecting net related user activity, automatically set the communication network access controller into the second monitoring mode, and in the second monitoring mode, upon the net related user activity detecting means does not detecting any net related user activity in a predefined period of time ($t_w$) set the communication network access controller into the first monitoring mode;

connecting means to connect the net access controller to a connection between an interface through which the computer is communicating with said communication network and the communication network;

switch means controlled by said controlling access means to interrupt the communication between the computer and the communication network by interrupting the physical connection of the computer to the communication network.

19. The system according to claim 18, wherein the net access controller further comprises a communication module for communication via a second communication network different from said communication network.

20. The system according to claim 19, wherein the second communication network is a wireless telephony system.

* * * * *